Feb. 20, 1968     M. N. TODD, JR., ET AL     3,369,370
METHOD OF DETECTOR COOLING AND DEVICE THEREFOR
Filed Dec. 3, 1965
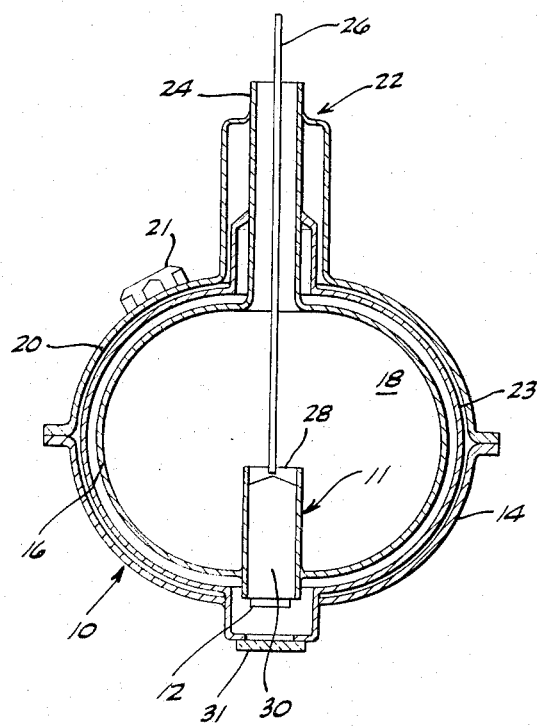
INVENTORS
MARION N. TODD JR.,
FRANKLIN J. MEYERS,
ATTORNEY.

United States Patent Office
3,369,370
Patented Feb. 20, 1968

3,369,370
METHOD OF DETECTOR COOLING
AND DEVICE THEREFOR
Marion N. Todd, Jr., Santa Monica, and Franklin J.
Meyers, Woodland Hills, Calif., assignors to Hughes
Aircraft Company, Culver City, Calif., a corporation
of Delaware
Filed Dec. 3, 1965, Ser. No. 511,400
2 Claims. (Cl. 62—45)

The invention relates to a method of detector cooling and device therefor that has particular utility in those applications which contemplate service in space under zero gravity conditions.

Considerable interest has been developed in utilizing long-wavelength infrared detectors as informational sources in orbiting spacecraft and other short-run airborne equipment. As is well known, infrared detectors of this type require, for optimum operation, that they be maintained at extremely low temperatures frequently of an order of approximately 10° Kelvin or below. In order to place the detector in its operating environment, namely, in a craft orbiting in space, it is necessary that a launch vehicle such as a rocket be employed. The launch vehicle is usually an intricate structure and realistically requires standby periods of several hours during a long countdown prior to launch. This long countdown period precludes the effective utilization of ground support equipment to maintain the detector in operating temperature range. The use of recently developed cryoengines which may be carried abroad the launch vehicle to cool the detector have not always proved reliable and present disadvantages of extra weight and expensive initial cost. Further, extreme difficulty is encountered maintaining liquid cryogen in heat load juxtaposition under the zero gravity condition of space, that is, liquid droplets form which move away from the load and vent to space. With this in mind, the utilization of liquefied cryogenic materials to maintain optimum detector temperature level has been avoided.

To remedy the difficulties noted, interest has been expressed in the utilization of solid cryogenic elements to maintain the desired detector temperature levels. One method of utilizing a solid cryogen involves the positioning of a cryogen such as hydrogen in the Dewar in liquid form prior to launch and then solidifying the cryogen by reducing the pressure in the Dewar. This reduces the boiling temperature thereof to below the three-phase point and the cryogen solidifies as it can no longer exist as a liquid. To be effective in most applications requires continuous pumping, hence disadvantage of requiring that the launch vehicle carry the required pumping equipment. It has further been suggested that a solid cryogen such as hydrogen be stored in a sealed Dewar in heat transfer juxtaposition to the load and thus provide cooling during countdown and in space. It has been found, however, that during the pre-launch period the pressure of the hydrogen gas, due to evaporative sublimation, builds up unless it can be continuously pumped away and an appreciable part of the cryogen liquefies and under zero gravity conditions is exhausted through a required pressure relief valve. Faulty detector operation in space results.

The disclosed invention contemplates the utilization of a multi-container Dewar having an inner chamber or container adapted to contain solid hydrogen in appropriate physical relation to a detecting device and ultimately provide detector cooling under zero gravity or free fall conditions. The inner container is disposed in an outer container or Dewar, the latter, while in ground environment, being provided with a fill port which may be connected to a liquid cryogen source such as liquid helium. The inner container or Dewar is provided with an appropriate connection to a source of hydrogen gas so that it may be easily filled while in ground environment.

In operation it will be understood that the outer container or Dewar is initially filled with a liquid cryogen such as helium, which has a temperature level of approximately 4° Kelvin. The filling of the liquid cryogen occurs immediately prior to countdown. After helium filling the inner container is filled with hydrogen gas and the extremely low temperature of the liquid helium induces the hydrogen gas to condense and solidify within the inner container. The detector, of course, is positioned in heat exchange relationship with the inner container. The evaporating liquid helium initially helps maintain the detector device at its operating temperature range during countdown time in ground environment. A sufficient volume of helium is provided so that it will not all evaporate during the anticipated countdown period and while under acceleration into the zero gravity condition of space. Additionally, the structure contemplates that the outer container holding the liquid helium is in communication with the atmosphere.

After the detector-carrying vehicle reaches orbital environment or other zero gravity condition, the liquid helium may be dispersed in space because of the weightless condition. The solid hydrogen cryogen is now used to absorb the heat load of the detector via its latent heat of sublimation. The temperature level of the solid cryogen may also be controlled by controlling the vapor pressure over the surface thereof. However, the pressure must not exceed that of the triple point or liquefaction will result.

These and other features of the invention will be more clearly understood by reference to the following specification and the related drawing wherein:

The single figure is a partially schematic central vertical sectional view of a Dewar arrangement which may be utilized in the invention.

Describing the invention in detail and directing attention to the figure, a cryogenic Dewar indicated generally at 10 may comprise an inner container 11 having a detector device 12 physically mounted thereon and in heat transfer relation therewith. The inner container 11 is supported by an inner shell 16 which is surounded by outer shell 14 defining a major reservoir 18. A vacuum may be provided in cavity 20 interposed between the inner and outer shells. Conventional connection port 21 may be provided for this purpose. The cavity 20 provides the desired insulation effect and may be filled with conventional super insulation. Intermediate the inner and outer shells 14 and 16 a thermal radiation shield 23 may be provided. The outer and inner shells 14 and 16 define, at the upper aspect of the vessel, a fill port indicated generally at 22. The port 22 comprises an outer pipe 24 communicating with chamber 18 and a telescopically received inner pipe 26 projecting into chamber 18, through cap 28 and communicating with chamber 30 of container 11. A window 31 is provided in alignment with device 12 to admit energy waves for detector sensing.

As noted above, it is contemplated that in the space environment the heat load capacity of a solid cryogen such as hydrogen within the container 11 be utilized to cool the detector 12 and maintain the latter at operating temperatures. Also, as noted above, the launch vehicles in use today require extended countdown periods which precludes the utilization of ground support equipment to provide the cooling capacity immediately prior to launch. If the solid cryogen is merely placed within a container 10 immediately prior to countdown it will liquefy if exposed to atmospheric pressure. If container 10 is pumped to maintain a low pressure the solid begins to sublimate and dissipate, hence, its efficient use in the space environment is frustrated.

The present invention contemplates that immediately prior to countdown the Dewar will be connected to a source of liquid helium (not shown) and the reservoir 18 filled via pipe 22. After filling the reservoir 18 with liquid helium pipe 26 is connected to a source of hydrogen gas. Chamber 30 of container 11 is filled. At atmospheric pressure liquid helium has a temperature level of about 4° Kelvin. At this temperature hydrogen gas solidifies. Thus the helium is effective to solidify the hydrogen in chamber 30 and provide initial aid in detector cooling while in ground environment during countdown. Of course, pipe 26 is disconnected from its hydrogen source and the helium fill source is disconnected prior to initiating countdown. In view of the fact that the length of the countdown period is a known factor and the rate of evaporation of liquid helium in the earth's environment is also a known factor, it will be understood that a sufficient volume of helium is provided within the reservoir 18 so that it will not be dissipated in its entirety during countdown and during the elapsed time required for launch into space. While in the earth's environment the port 22 is positioned upwardly, hence, gravity holds the helium within the reservoir 16 during countdown standby. Upon launch, the vertical axis of the device is oriented with the thrust axis of the vehicle, hence, vehicle thrust maintains the liquid helium within the reservoir 18 until the vehicle is in space or under zero gravity condition. It is also noted that the inner container 11 is preferably made of a material that will provide efficient thermal transfer between the chambers 18 and 30. Copper is found to be satisfactory.

It will also be understood that pipes 24 and 26, after disconnect from the source of helium and hydrogen, respectively, will open and vent to atmosphere. Thus, the evaporation of the helium to atmosphere is accommodated during pre-launch countdown and during launch into space. After the vehicle is under zero gravity the dissipation of the remaining liquid helium is allowed because of the existent weightless condition. At this time the solid hydrogen within chamber 30 is utilized to provide the total cooling of the detector 12 as required. The space vacuum which is exisent in the ambient area is effective to insulate the inner container 11.

As noted, the pipe 26 after disconnect from the hydrogen sources, is in communication with the atmosphere. Thus, as the solid hydrogen sublimates, the evaporated gas may be dissipated to the ambient condition. Hydrogen will normally, in a vacuum condition, maintain its solid condition at a temperature between 10° and 20° Kelvin. The specific temperature within that range of the solid hydrogen is directly related to the vapor pressure existent over the surface thereof. Thus the venting tube 26 may be considered as an orifice accommodating the escape of the vaporized gas. By enlarging the tube and accommodating the relatively rapid escape of vaporized gas the temperature level of the solid hydrogen may be lowered. Alternately, by reducing the size of the tube or pipe 26 the vapor pressure over the surface of the solid hydrogen within chamber 30 may be increased thus raising the temperature of the solid hydrogen.

While in the disclosed invention a specific example was used, namely, utilizing liquid helium to solidify a hydrogen gas, it will be understood that other cryogenic materials may be utilized at other temperatures to achieve the desired result. The invention as disclosed is by way of illustration and not limitation and may be modified all within the scope of the appended claims.

What is claimed is:

1. In a method of providing detector cooling under zero gravity and vacuum condition where the detector is mounted in thermal transfer association with a Dewar having separate chambers in direct conductive thermal transfer relation, the Dewar being carried into said zero gravity and vacuum condition requiring an elapsed pre-launch countdown time under gravity condition and elapsed time under thrust condition during launch;

the steps of filling one of said chambers with a cryogenic liquid, filling the second chamber with a cryogenic fluid, solidifying said fluid by accommodating the vaporization of said liquid and allowing vapor escape to ambient condition during said elapsed times, further accommodating the escape of said liquid and vaporized liquid from said one container under zero gravity condition to effect a vacuum in said one container surrounding said second container, and accommodating the escape of vaporized fluid from said solidified fluid to ambient vacuum condition under zero gravity condition.

2. The method according to claim 1, and including orienting the Dewar so that gravity is effective to maintain said cryogenic liquid in conductive thermal transfer relation to said second container prior to launch and thrust is effective to maintain said cryogenic liquid in conductive thermal transfer relation to said second container during launch and immediately prior to entry into said zero gravity and vacuum condition.

References Cited
UNITED STATES PATENTS

| | | | |
|---|---|---|---|
| 1,680,873 | 8/1928 | Girardville | 62—47 |
| 2,513,749 | 7/1950 | Schilling | 62—45 |
| 2,816,232 | 12/1957 | Burstein | 62—45 X |
| 2,880,593 | 4/1959 | Johnson et al. | 62—45 |
| 3,192,733 | 7/1965 | Geotz et al. | 62—45 |
| 3,253,423 | 5/1966 | Sonnabend | 62—514 X |

LLOYD L. KING, *Primary Examiner.*